(12) United States Patent
Aida et al.

(10) Patent No.: US 8,292,203 B2
(45) Date of Patent: Oct. 23, 2012

(54) METHOD FOR GRANULATING ETHYLENE/TETRAFLUOROETHYLENE COPOLYMER

(75) Inventors: Shigeru Aida, Tokyo (JP); Atsushi Tsuji, Tokyo (JP); Akio Ogawa, Tokyo (JP); Toshiyuki Chisaka, Tokyo (JP); Jumpei Nomura, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/163,800

(22) Filed: Jun. 20, 2011

(65) Prior Publication Data

US 2011/0240773 A1    Oct. 6, 2011

Related U.S. Application Data

(63) Continuation of application No. PCT/JP2009/071259, filed on Dec. 21, 2009.

(30) Foreign Application Priority Data

Dec. 26, 2008 (JP) ................................. 2008-335047

(51) Int. Cl.
*B02C 19/00* (2006.01)
(52) U.S. Cl. ............................................ 241/21; 241/23
(58) Field of Classification Search .................... 241/21, 241/171, 172, 23
See application file for complete search history.

(56) References Cited

U.S. PATENT DOCUMENTS

| | | | |
|---|---|---|---|
| 4,714,756 A | 12/1987 | Buckmaster | |
| 5,862,999 A * | 1/1999 | Czekai et al. | 241/21 |
| 6,991,191 B2 * | 1/2006 | Reed et al. | 241/21 |
| 7,019,079 B2 * | 3/2006 | Sumi et al. | 525/199 |

FOREIGN PATENT DOCUMENTS

| | | |
|---|---|---|
| EP | 1 405 876 A1 | 4/2004 |
| JP | 48-51084 | 7/1973 |
| JP | 62-101632 | 5/1987 |
| JP | 11-35694 | 9/1999 |
| JP | 2000-103865 | 4/2000 |
| JP | 3500655 | 2/2004 |
| JP | 2004-168982 | 6/2004 |
| JP | 2005-29704 | 2/2005 |

OTHER PUBLICATIONS

International Search Report issued Mar. 23, 2010 in PCT/JP09/071259 filed Dec. 21, 2009.

Supplementary European Search Report dated Apr. 12, 2012, issued in the corresponding European Application 09834840.2, filed Dec. 21, 2009 (with English-language Translation).

* cited by examiner

*Primary Examiner* — Mark Rosenbaum
(74) *Attorney, Agent, or Firm* — Oblon, Spivak, McClelland, Maier & Neustadt, L.L.P.

(57) ABSTRACT

To provide a method for producing ETFE granules having a low content of an ethylene/tetrafluoroethylene copolymer oligomer and being excellent in handling efficiency.

A method for granulating an ethylene/tetrafluoroethylene copolymer, which is characterized by stirring and granulating a slurry of an ethylene/tetrafluoroethylene copolymer together with water in the presence of both ethylene and tetrafluoroethylene at a granulation temperature of from 10 to 130° C. for a granulation time of from 30 to 240 minutes.

12 Claims, No Drawings

METHOD FOR GRANULATING ETHYLENE/TETRAFLUOROETHYLENE COPOLYMER

This application is a continuation of PCT/JP09/71259 filed Dec. 21, 2009.

TECHNICAL FIELD

The present invention relates to a method for producing granules of an ethylene/tetrafluoroethylene copolymer.

BACKGROUND ART

An ethylene/tetrafluoroethylene copolymer (hereinafter sometimes referred to as ETFE) is excellent in heat resistance, chemical resistance, electrical insulating properties, flame retardancy, weather resistance and molding processability and is used as an insulating coating material for electric wires to be used for aircraft, atomic power plants, automobiles or industrial robots.

When ETFE obtained by a polymerization method such as solution polymerization or suspension polymerization is granulated, the handling efficiency of ETFE obtained by the polymerization will be improved, and clogging by ETFE in the carrier piping to an extruder or during pipe transportation is less likely to occur at the time of pelletizing ETFE by melt extrusion. Further, also at the time of processing ETFE into a fine powder having a desired particle size by pulverizing it, granulated ETFE is excellent in handling efficiency, such being desirable.

As a method for granulating ETFE, a method is known wherein after copolymerizing ethylene, tetrafluoroethylene and, if necessary, other comonomers, by a polymerization method such as solution polymerization or suspension polymerization, unreacted monomer gases are purged, and then a slurry of ETFE is granulated to obtain ETFE granules (Patent Document 1).

In order to produce ETFE granules efficiently and at low cost, it is preferred to transport the ETFE slurry from the polymerization tank to the granulation tank by the monomer gas pressure, since an equipment such as a transfer pump may be omitted.

However, if, in the granulation tank, ETFE is granulated in the presence of monomer gases of ethylene and tetrafluoroethylene, while recovering such monomer gases and the polymerization medium, an ETFE oligomer is likely to be formed in the granulation tank, and there has been a case where the properties of ETFE are not adequate depending upon the particular application of ETFE. Further, there has been a case where a piping is clogged, since fine particles of ETFE are contained in the ETFE granules depending upon the granulation conditions.

PRIOR ART DOCUMENT

Patent Document

Patent Document 1: Japanese Patent No. 3,500,655

DISCLOSURE OF INVENTION

Technical Problem

It is an object of the present invention to provide a method for granulating ETFE having a small content of an ETFE oligomer and being excellent in handling efficiency, which is required to be developed under the above-described background.

Solution to Problem

The present invention provides a method for granulating ETFE, having the following construction.

[1] A method for granulating an ethylene/tetrafluoroethylene copolymer, which is characterized by stirring and granulating a slurry of an ethylene/tetrafluoroethylene copolymer together with water in the presence of both ethylene and tetrafluoroethylene at a granulation temperature of from 10 to 130° C. for a granulation time of from 30 to 240 minutes.

[2] The method for granulating an ethylene/tetrafluoroethylene copolymer according to the above [1], wherein the slurry contains a polymerization medium, and the polymerization medium is at least one member selected from the group consisting of a fluorinated hydrocarbon, a chlorinated hydrocarbon, a fluorochlorinated hydrocarbon, an alcohol and a hydrocarbon.

[3] The method for granulating an ethylene/tetrafluoroethylene copolymer according to the above [1] or [2], wherein the amount of an ethylene/tetrafluoroethylene copolymer oligomer contained in granules obtained by the method for granulating an ethylene/tetrafluoroethylene copolymer, is at most 0.23%.

[4] The method for granulating an ethylene/tetrafluoroethylene copolymer according to any one of the above [1] to [3], wherein the rotational speed of a stirring blade used for the stirring is from 30 to 500 rpm.

[5] The method for granulating an ethylene/tetrafluoroethylene copolymer according to any one of the above [1] to [4], wherein the concentration of the ethylene/tetrafluoroethylene copolymer contained in the slurry is from 50 to 200 g/L (polymerization medium).

[6] The method for granulating an ethylene/tetrafluoroethylene copolymer according to any one of the above [1] to [5], wherein the total amount of ethylene and tetrafluoroethylene present in the slurry of an ethylene/tetrafluoroethylene copolymer at the initiation of the granulation is from 0.01 to 0.5 $Nm^3$/L (polymerization medium).

[7] The method for granulating an ethylene/tetrafluoroethylene copolymer according to any one of the above [1] to [6], wherein a stirring blade used for the stirring is an anchor blade or a disk turbine blade.

[8] The method for granulating an ethylene/tetrafluoroethylene copolymer according to any one of the above [1] to [7], wherein the content of fine particles of ethylene/tetrafluoroethylene copolymer having a particle size of less than 0.15 mm contained in granules of ethylene/tetrafluoroethylene copolymer obtained by the method for granulating an ethylene/tetrafluoroethylene copolymer, is at most 0.3 mass %.

[9] The method for granulating an ethylene/tetrafluoroethylene copolymer according to any one of the above [1] to [8], wherein the average particle size of the granules is from 0.5 to 5 mm.

[10] The method for granulating an ethylene/tetrafluoroethylene copolymer according to any one of the above [1] to [9], wherein the ethylene/tetrafluoroethylene copolymer comprises repeating units based on tetrafluoroethylene, repeating units based on ethylene and repeating units based on a compound represented by the formula $CH_2=CX(CF_2)_nY$ (wherein each of X and Y which are independent of each other, is a hydrogen atom or a fluorine atom, and n is an integer of from 2 to 8), the molar ratio of the repeating units based on tetrafluoroethylene/the repeating units based on ethylene is from 80/20 to 20/80, and the content of the repeating units based on a compound represented by the formula $CH_2=CX(CF_2)_nY$ is from 0.01 to 20 mol % in the total repeating units of the ethylene/tetrafluoroethylene copolymer.

Advantageous Effects of Invention

The ETFE granules produced by the method for granulating ETFE of the present invention have a low content of an ETFE oligomer and are excellent in physical properties such as moldability, mechanical strength, electric insulation properties, etc., and further, they are excellent also in handling efficiency, since the content of fine particles of ETFE contained in the ETFE granules is small.

DESCRIPTION OF EMBODIMENTS

The ETFE slurry to be used in the method for granulating ETFE of the present invention may be an ETFE slurry produced by any one of various methods such as suspension polymerization, solution polymerization, emulsion polymerization and bulk polymerization, preferably an ETFE slurry produced by suspension polymerization or solution polymerization, most preferably an ETFE slurry produced by solution polymerization. Here, the ETFE slurry is one in such a state that ETFE is dissolved, or swelled and suspended, in a polymerization medium.

The ETFE slurry to be used in the present invention is preferably one obtained by polymerizing ethylene, tetrafluoroethylene and, if necessary, other monomers, in the presence of a polymerization medium together with a radical polymerization initiator, a chain transfer agent to adjust the molecular weight, etc., at a prescribed temperature for a prescribed time with stirring.

ETFE contains repeating units based on ethylene (hereinafter sometimes referred to as "E") and repeating units based on tetrafluoroethylene (hereinafter sometimes referred to as "TFE"), and their content ratio (molar ratio) is preferably from 80/20 to 20/80, more preferably from 70/30 to 30/70, most preferably from 60/40 to 40/60.

If the molar ratio of (repeating units based on E)/(repeating units based on TFE) is extremely high, the heat resistance, weather resistance, chemical resistance, reagent-penetration preventive property, etc. of the ETFE may sometimes be deteriorated. On the other hand, if such molar ratio is extremely low, the mechanical strength, melt-moldability, etc. may sometimes be deteriorated. When the molar ratio is within this range, the ETFE will be excellent in heat resistance, weather resistance, chemical resistance, reagent-penetration preventive property, mechanical strength, melt moldability, etc.

Further, in addition to the above-mentioned repeating units based on E and repeating units based on TFE, ETFE may contain repeating units based on at least one of other monomers within a range not to impair the essential properties of ETFE.

Such other monomers may, for example, be an α-olefin such as propylene or butene; a compound represented by $CH_2=CX(CF_2)_nY$ (wherein each of X and Y which are independent of each other, is a hydrogen atom or a fluorine atom, and n is an integer of from 2 to 8); a fluoroolefin having hydrogen atoms in an unsaturated group, such as vinylidene fluoride (VDF), vinyl fluoride (VF), trifluoroethylene or hexafluoroisobutylene (HFIB); a fluoroolefin having no hydrogen atom in an unsaturated group (provided that TFE is excluded), such as hexafluoropropylene (HFP), chlorotrifluoroethylene (CTFE), perfluoro(methyl vinyl ether) (PMVE), perfluoro(ethyl vinyl ether) (PEVE), perfluoro(propyl vinyl ether) (PPVE), perfluoro(butyl vinyl ether) (PBVE) or other perfluoro(alkyl vinyl ethers) (PAVE); a perfluoro vinyl ether having an unsaturated bond such as $CF_2=CFOCF_2CF=CF_2$ or $CF_2=CFO(CF_2)_2CF=CF_2$; and a fluorinated monomer having an alicyclic structure, such as perfluoro(2,2-dimethyl-1,3-dioxole) (PDD), 2,2,4-trifluoro-5-trifluoromethoxy-1,3-dioxole or perfluoro(2-methylene-4-methyl-1,3-dioxolane). One or more of such monomers may be used.

Among such other monomers, it is particularly preferred to use a compound represented by the above formula $CH_2=CX(CF_2)_nY$ (hereinafter referred to as "FAE"). FAE is, as mentioned above, a compound represented by the formula $CH_2=CX(CF_2)_nY$ (wherein each of X and Y which are independent of each other, is a hydrogen atom or a fluorine atom, and n is an integer of from 2 to 8). If n in the formula is less than 2, the properties of ETFE tend to be inadequate (e.g. formation of stress cracks in an ETFE-molded product). On the other hand, if n in the formula exceeds 8, such is likely to be disadvantageous from the viewpoint of the polymerization reactivity.

FAE may, for example, be $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_8H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_5H$ or $CH_2=CH(CF_2)_8H$. One or more of such FAE may be used.

Among them, a compound represented by $CH_2=CH(CF_2)_nY$ is more preferred, and in such a case, n in the formula is more preferably n=2 to 6, since its molded product will be excellent in stress crack resistance, most preferably n=2 to 4.

In ETFE, the content of repeating units based on FAE is preferably from 0.01 to 20 mol %, more preferably from 0.1 to 15 mol %, further preferably from 1 to 10 mol %, in the total repeating units of the ETFE. If the content of FAE is less than the above value, the stress crack resistance of the molded product formed of ETFE is likely to be deteriorated, and there may be a case where a fracture phenomenon such as cracking is likely to occur under a stress. On the other hand, if it exceeds the above value, the mechanical strength of the ETFE may sometimes be deteriorated.

The above-mentioned polymerization medium to be used for the preparation of the ETFE slurry, may, for example, be an organic solvent such as a fluorinated hydrocarbon, a chlorinated hydrocarbon, a fluorochlorinated hydrocarbon, an alcohol or a hydrocarbon.

The polymerization medium is preferably one member selected from the group consisting of a fluorinated hydrocarbon, a chlorinated hydrocarbon, a fluorochlorinated hydrocarbon, an alcohol and a hydrocarbon.

Specific examples of the polymerization medium include a perfluorocarbon such as n-perfluorohexane, n-perfluoroheptane, perfluorocyclobutane, perfluorocyclohexane or perfluorobenzene; a hydrofluorocarbon such as 1,1,2,2-tetrafluorocyclobutane, $CF_3CFHCF_2CF_2CF_3$, $CF_3(CF_2)_4H$, $CF_3CF_2CFHCF_2CF_3$, $CF_3CFHCFHCF_2CF_3$, $CF_2HCFHCF_2CF_2CF_3$, $CF_3(CF_2)_5H$, $CF_3CH(CF_3)CF_2CF_2CF_3$, $CF_3CF(CF_3)CFHCF_2CF_3$, $CF_3CF(CF_3)CFHCFHCF_3$, $CF_3CH(CF_3)CFHCF_2CF_3$, $CF_3CF_2CH_2CH_3$ or $CF_3(CF_2)_3CH_2CH_3$; a hydrofluoroether such as $CF_3CH_2OCF_2CF_2H$, $CF_3(CF_3)CFCF_2OCH_3$ or $CF_3(CF_2)_3OCH_3$; and a fluorochlorinated hydrocarbon such as 1,3- dichloro-1,1,2,2,3-pentafluoropropane. Among them, $CF_3(CF_2)_5H$ or $CF_3CH_2OCF_2CF_2H$ is more preferred, and $CF_3(CF_2)_5H$ is most preferred.

The above-mentioned chain transfer agent may, for example, be an alcohol such as methanol, ethanol, 2,2,2-trifluoroethanol, 2,2,3,3-tetrafluoropropanol, 1,1,1,3,3,3-hexafluoroisopropanol or 2,2,3,3,3-pentafluoropropanol; a fluorochlorinated hydrocarbon such as 1,3-dichloro-1,1,2,2,3-pentafluoropropane or 1,1-dichloro-1-fluoroethane; a hydrocarbon such as n-pentane, n-hexane, n-heptane or cyclohexane; a hydrofluorocarbon such as $CF_2H_2$; a ketone such as acetone; a mercaptan such as methylmercaptan; an ester such as methyl acetate or ethyl acetate; or an ether such as diethyl ether or methyl ethyl ether. Here, a fluorochlorinated hydrocarbon such as 1,3-dichloro-1,1,2,2,3-pentafluoropropane has a small chain transfer coefficient and can also be used as a polymerization medium.

The above-mentioned radical polymerization initiator is preferably a radical polymerization initiator, of which the temperature at which the half-life is 10 hours, is from 0 to 100° C., more preferably a radical polymerization initiator, of which such a temperature is from 20 to 90° C.

Specific examples include an azo compound such as azobisisobutyronitrile; a peroxydicarbonate such as diisopropylperoxydicarbonate; a peroxyester such as tert-butyl peroxypivalate, tert-butylperoxyisobutylate or tert-butylperoxyacetate; a non-fluorine type diacyl peroxide such as isobutyryl peroxide, octanoyl peroxide, benzoyl peroxide or lauroyl peroxide; a fluorinated diacyl peroxide such as $(Z(CF_2)_pCOO)_2$ (wherein Z is a hydrogen atom, a fluorine atom or a chlorine atom, and p is an integer of from 1 to 10); a perfluorotert-butyl peroxide; and an inorganic peroxide such as potassium persulfate, sodium persulfate or ammonium persulfate.

The polymerization conditions at the time of the production of ETFE are not particularly limited, and the polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours, more preferably from 2 to 20 hours.

The concentration of ETFE contained in the slurry obtained by the polymerization is preferably from 50 to 200 g/L (polymerization medium), more preferably from 100 to 180 g/L (polymerization medium). If the concentration of ETFE is lower than this range, the yield of granules per batch tends to be small, and the productivity tends to be low. If the concentration is higher than this range, fine particles of ETFE tend to be formed, whereby fine particles of ETFE are likely to be contained in the ETFE granules. When the concentration of ETFE contained in the slurry is within the above range, the productivity of the ETFE granules will be excellent, fine particles of ETFE tend to be scarcely formed, and fine particles of ETFE are less likely to be contained in the ETFE granules.

After being produced by various polymerization methods, the slurry of ETFE in the granulation method of the present invention is preferably transported from the polymerization tank to the granulation tank via a piping together with unreacted monomers such as ethylene and tetrafluoroethylene contained in the ETFE slurry. It is preferred that in the granulation tank, a prescribed amount of water to be a dispersing medium for ETFE granules, is added, and then, in the granulation tank, the ETFE slurry and water are heated with stirring, and powdery ETFE is granulated, while distilling off volatile components such as monomers such as ethylene and tetrafluoroethylene, a polymerization medium, a chain transfer agent, etc.

In the granulation method of the present invention, the pressure in the granulation tank is raised by vapors of monomers such as ethylene and tetrafluoroethylene, a polymerization medium, etc., and accordingly, it is preferred to carry out granulation, while continuously distilling and recovering the above components from the granulation tank so that the pressure in the granulation tank becomes to be constant. Monomers such as ethylene and tetrafluoroethylene, and a polymerization medium, distilled from the granulation tank are preferably recovered via a heat exchanger or a dehydration tower in a gas holder or a polymerization medium tank and then re-used.

In the granulation method of the present invention, the granulation temperature is preferably from 10 to 130° C., more preferably from 20 to 110° C. If the granulation temperature is lower than the above range, it takes time for distillation of gaseous monomers of ethylene and tetrafluoroethylene, and the polymerization medium, and the amount of an ETFE oligomer to be formed, increases. If the granulation temperature is higher than the above range, water which is present as a dispersant for ETFE granules, tends to evaporate. When the granulation temperature is within the above range, the gaseous monomers and the polymerization medium can be distilled in a short time while dispersing the ETFE slurry in water, whereby it is possible to produce ETFE granules having a uniform particle size with little ETFE oligomer content.

The granulation time of the slurry is preferably from 30 to 240 minutes, more preferably from 60 to 200 minutes, further preferably from 80 to 150 minutes. If the granulation time is shorter than the above range, the gaseous monomers and the polymerization medium tend to be rapidly distilled, and it will be required to increase the capacities of the heating device for the granulation tank and the device to liquefy the distilled monomers and the polymerization medium. If the granulation time is longer than the above range, the amount of an ETFE oligomer formed in the granulation tank tends to increase, or the production steps tend to be long, whereby the production efficiency tends to be low. When the granulation time is within the above range, it is possible to efficiently produce ETFE granules having little ETFE oligomer content by means of an economically excellent apparatus. Here, the granulation time is the time from the start of distillation of monomers of ethylene and tetrafluoroethylene, and the polymerization medium, in the granulation tank, to the end of the distillation.

In the granulation method of the present invention, the rotational speed of a stirring blade to be used for the stirring is preferably from 30 to 500 rpm, more preferably from 50 to 500 rpm, most preferably from 80 to 250 rpm. If the rotational speed is slower than the above range, the slurry may not be adequately stirred, and granules having a uniform particle size tend to be hardly obtainable. If the rotational speed for the stirring is faster than the above range, the particle size of granules tends to be small. When the rotational speed for the stirring is within the above range, it is possible to produce ETFE granules having a uniform particle size and being excellent in handling efficiency, wherein the content of fine particles of ETFE having a particle size of less than 0.15 mm is small.

The stirring blade is preferably an anchor blade or a disk turbine blade. Such stirring blades may be used in combination, or a plurality of stirring blades may be used. Further, it is preferred to use a baffle plate to obtain a good stirring state.

The content of ethylene and tetrafluoroethylene as monomers contained in the ETFE slurry at the initiation of the granulation is preferably from 0.01 to 0.5 $Nm^3/L$ (polymerization medium), more preferably from 0.02 to 0.2 Nm$^3$/L (polymerization medium). If the content of monomers contained in the ETFE slurry is smaller than the above range, it takes time in the step of distilling and recovering such monomers from the granulation tank. If such a monomer content in the ETFE slurry is larger than the above range, the amount of the ETFE oligomer to be formed in the granulation step will increase. When the content of monomers contained in the ETFE slurry is within the above range, it is possible to produce ETFE granules with little ETFE oligomer content in a short time, such being desirable.

In the granulation step, the molar ratio of ethylene to tetrafluoroethylene to be present, is preferably within a range of from 40/60 to 98/2, more preferably within a range of from 55/45 to 97/3, further preferably within a range of from 65/35 to 97/3.

In the granulation method of the present invention, the content of water is, as represented by a mass ratio to the polymerization medium, preferably water/polymerization medium=from 90/10 to 10/90, more preferably from 70/30 to 30/70, most preferably from 60/40 to 40/60. Within this range, the amount of fine particles of ETFE contained in the ETFE granules will be little.

The content of the ETFE oligomer contained in the ETFE granules obtained by the granulation method of the present invention is preferably at most 0.23 mass %, more preferably at most 0.20 mass %. If the ETFE oligomer content is larger than the above, poor appearance of a molded product is likely to result at the time of extrusion molding, or stress crack resistance of the obtained molded product tends to be low, such being undesirable.

Here, in this specification, the ETFE oligomer is meant for one which can be extracted by the method for measuring the ETFE oligomer content as described in Examples.

The average particle size of the ETFE granules obtained by the granulation method of the present invention is preferably from 0.5 to 5 mm, more preferably from 1 to 3 mm.

The content of fine particles of ETFE having a particle size of less than 0.15 mm, contained in the ETFE granules obtained by the granulation method of the present invention, is preferably at most 0.3 mass %, more preferably at most 0.2 mass %. If the content of fine particles of ETFE exceeds 0.3 mass %, blocking is likely to occur when the ETFE granules are transported by a piping or fed from a hopper to an extruder.

In the present invention, the volume flow rate of ETFE (hereinafter referred to as value Q) is preferably from 0.01 to 1,000 mm$^3$/sec, more preferably from 0.1 to 500 mm$^3$/sec, most preferably from 1 to 200 mm$^3$/sec. The value Q is an index showing the melt fluidity of a fluorinated copolymer and will be an index for the molecular weight. The larger the value Q, the smaller the molecular weight, and the smaller the value Q, the larger the molecular weight. The value Q is the extrusion rate of a fluorinated copolymer when it is extruded through an orifice having a diameter of 2.1 mm and a length of 8 mm under a load of 7 kg at a temperature higher by 50° C. than the melting point of the resin, by means of a flow tester manufactured by Shimadzu Corporation. When the volume flow rate is within the above range, the fluororesin is excellent in the extrusion molding property and mechanical strength.

EXAMPLES

Now, the present invention will be described with reference to Examples and Comparative Examples, but it should be understood that the present invention is by no means thereby restricted.

In Examples, measurements and evaluations of various physical properties were carried out as follows.
[ETFE Copolymer Composition (mol %)]
Measured by means of FT-IR (Fourier Transform Infrared Spectrometer).
[Volume Flow Rate (mm$^3$/sec)]
By means of a flow tester manufactured by Shimadzu Corporation, the extrusion rate when a fluororesin is extruded from an orifice having a diameter of 2.1 mm and a length of 8 mm under a load of 7 kg at 297° C., was measured.
[Melting Point (° C.)]
By means of a scanning differential calorimeter (DSC7020, manufactured by SII Nano Technologies), the temperature was raised at a rate of 10° C./min to 300° C. in an atmospheric air atmosphere, and the melting point was obtained from the endothermic peak when heated.
[Average Particle Size of ETFE Granules]
ETFE granules were sieved by sieves with apertures of 2.0 mm, 1.4 mm, 1.0 mm, 0.710 mm, 0.500 mm, 0.212 mm and 0.150 mm, and the average particle size was calculated from the mass average value.
[Content of Fine Particles of ETFE (mass %)]
ETFE granules were sieved by a sieve with an aperture of 0.15 mm, and the mass of fine particles of ETFE passed through the sieve was measured.
[Content of ETFE Oligomer (mass %)]
30 g of pelletized ETFE and 300 g of 1,3-dichloro-1,1,2,2,3-pentafluoropropane (R-225cb, manufactured by Asahi Glass Company, Limited, hereinafter referred to as R-225cb) was put into a pressure container having an inner cylinder made of PTFE (polytetrafluoroethylene), and the pressure container was heated in an oven of 150° C. for 12 hours. The pressure container taken out from the oven was cooled to room temperature, and a mixture of ETFE and R-225cb was filtrated, and R-225cb contained in the filtrate was completely evaporated by a rotary evaporator, and the mass of the extracted ETFE oligomer was measured.
[Stress Crack Resistance Test]
A coated electric wire was heat-treated for 96 hours in an oven heated to 195° C., and then, the electric wire was fixed in such a state that it was wound at least 8 times on itself, and heat-treated for 1 hour in an oven heated to 200° C., whereby formation of cracks was ascertained. Five electric wires were evaluated for every lot.

Example 1

Into a vacuumed 430 L stainless steel autoclave, 317.2 kg of $CF_3(CF_2)_5H$, 100.5 kg of R-225cb and 1.24 kg of (perfluorobutyl)ethylene were charged and heated to 66° C. with stirring, and a mixed gas of tetrafluoroethylene/ethylene=83/17 (mol %) was introduced to 1.5 MPaG, and 536 g of a $CF_3(CF_2)_5H$ solution containing 1 mass % of tert-butyl peroxypivalate was injected to initiate the polymerization. During the polymerization, a mixed gas of tetrafluoroethylene/ethylene=54/46 (mol %) and (perfluorobutyl)ethylene in an amount corresponding to 1.0 mol % based on the above mixed gas, were continuously added so that the pressure became 1.5 MPaG. Then, after charging 31 kg of the tetrafluoroethylene/ethylene mixed gas, the autoclave was cooled, and a part of the remaining monomer gas was purged to obtain a slurry of ETFE1. The slurry contained 127 g of ETFE and 0.089 Nm$^3$ of monomers of ethylene and tetrafluoroethylene per 1 L of the polymerization medium (total amount of $CF_3(CF_2)_5H$ and R-225cb).

Then, the slurry was transferred to a 850 L granulation tank, and 340 L of water was added, and with stirring by rotating a disk turbine blade at 100 rpm, ETFE was granulated by heating while raising the temperature from 40 to 104° C. and distilling the polymerization medium and the remaining monomers over a period of 95 minutes. Then, water and the ETFE granules were separated by means of a meshed metal net. Then, the ETFE granules were transported to a vacuum dryer and dried at 130° C. for 4.5 hours to obtain 32 kg of ETFE granules 1.

The obtained ETFE granules 1 had a copolymer composition of repeating units based on tetrafluoroethylene/repeating units based on ethylene/repeating units based on (perfluorobutyl)ethylene=53.9/45.2/0.9 (mol %), a volume flow rate of 4.4 mm$^3$/sec, a melting point of 264° C., an average particle size of 1.6 mm and a content of fine particles of ETFE being 0.14 mass %.

The ETFE granules 1 were pelletized by a single screw extruder to obtain ETFE pellets 1. The ETFE oligomer content in the ETFE pellets 1 was measured and found to be 0.17 mass %. Further, by melt extrusion molding, an electric wire having a core wire with a diameter of 1.8 mm coated with ETFE 1 in a thickness of 0.5 mm, was formed. The obtained wire was subjected to a stress crack resistance test, whereby no crack was observed in all of five samples.

Example 2

32 kg of ETFE granules 2 were obtained by carrying out granulation in the same manner as in Example 1 except that the time for distilling the polymerization medium and the residual monomers of ethylene and tetrafluoroethylene from the granulation tank was changed to 115 minutes.

The obtained ETFE granules 2 had a copolymer composition of repeating units based on tetrafluoroethylene/repeating units based on ethylene/repeating units based on (perfluorobutyl)ethylene=54.0/45.1/0.9 (mol %), a volume flow rate of 3.4 mm$^3$/sec, a melting point of 264° C., an average particle size of 1.7 mm and a content of fine particles of ETFE being 0.06 mass %.

The ETFE granules 2 were pelletized by a single screw extruder to obtain ETFE pellets 2. The ETFE oligomer content in the ETFE pellets 2 was measured and found to be 0.18 mass %.

Example 3

32 kg of ETFE granules 3 were obtained by carrying out granulation in the same manner as in Example 1 except that the time for distilling the polymerization medium and the residual monomers of ethylene and tetrafluoroethylene from the granulation tank was changed to 147 minutes.

The obtained ETFE granules 3 had a copolymer composition of repeating units based on tetrafluoroethylene/repeating units based on ethylene/repeating units based on (perfluorobutyl)ethylene=53.8/45.3/0.9 (mol %), a volume flow rate of 3.9 mm$^3$/sec, a melting point of 265° C., an average particle size of 1.1 mm and a content of fine particles of ETFE being 0.14 mass %.

The ETFE granules 3 were pelletized by a single screw extruder to obtain ETFE pellets 3. The ETFE oligomer content in the ETFE pellets 3 was measured and found to be 0.18 mass %.

Example 4

ETFE granules 4 were obtained by carrying out granulation in the same manner as in Example 1 except that the time for distilling the polymerization medium and the residual monomers of ethylene and tetrafluoroethylene from the granulation tank was changed to 80 minutes.

Further, the ETFE granules 4 were pelletized by a single screw extruder to obtain ETFE pellets 4. The ETFE oligomer content in the ETFE pellets 4 was measured and found to be 0.16 mass %.

Comparative Example 1

Polymerization was carried out in the same manner as in Example 1, and the obtained slurry of ETFE 2 was granulated over a period of 262 minutes, and the polymerization medium and the residual monomers of ethylene and tetrafluoroethylene were removed. Then, drying was carried out in the same manner as in Example 1 to obtain 32 kg of ETFE granules 5.

The obtained ETFE granules 5 had a copolymer composition of repeating units based on tetrafluoroethylene/repeating units based on ethylene/repeating units based on (perfluorobutyl)ethylene=54.2/44.8/1.0 (mol %), a volume flow rate of 4.2 mm$^3$/sec, a melting point of 263° C., an average particle size of 1.6 mm and a fine particle content of 0.37 mass %.

The ETFE granules 5 were pelletized by a single screw extruder to obtain ETFE pellets 5. The ETFE oligomer content in the ETFE pellets 5 was measured and found to be 0.26 mass %. Further, by melt extrusion molding, an electric wire having a core wire with a diameter of 1.8 mm coated with the ETFE pellets 5 in a thickness of 0.5 mm, was formed. The obtained wire was subjected to a stress crack resistance test, whereby cracks were observed in all of five samples.

INDUSTRIAL APPLICABILITY

The method for granulating ETFE of the present invention is excellent in productivity, and the ETFE granules thereby obtained have a small ETFE oligomer content, and its molded product is excellent in heat resistance. Further, the granules are excellent in handling efficiency, since the content of fine particles of ETFE is small.

Accordingly, the ETFE granules of the present invention is useful not only in a usual application of ETFE granules but also in a field where excellent heat resistance is required.

The entire disclosure of Japanese Patent Application No. 2008-335047 filed on Dec. 26, 2008 including specification, claims and summary is incorporated herein by reference in its entirety.

What is claimed is:

1. A method for granulating an ethylene/tetrafluoroethylene copolymer, comprising stirring and granulating a slurry comprising an ethylene/tetrafluoroethylene copolymer, water, ethylene, and tetrafluoroethylene at a granulation temperature of from 10 to 130° C. for a granulation time of from 30 to 240 minutes while distilling off volatile components, wherein said ethylene and tetrafluoroethylene are present in said slurry at initiation of said granulating in an amount of from 0.01-0.5 Nm$^3$/L.

2. The method for granulating an ethylene/tetrafluoroethylene copolymer according to claim 1, wherein the slurry further comprises at least one member selected from the group consisting of a fluorinated hydrocarbon, a chlorinated hydrocarbon, a fluorochlorinated hydrocarbon, an alcohol and a hydrocarbon.

3. The method for granulating an ethylene/tetrafluoroethylene copolymer according to claim 1, wherein granules of the ethylene/tetrafluoroethylene copolymer produced by said method comprise an amount of an ethylene/tetrafluoroethylene copolymer oligomer of at most 0.23%.

4. The method for granulating an ethylene/tetrafluoroethylene copolymer according to claim 1, wherein said stirring is accomplished with a stirring blade, and wherein the rotational speed of the stirring blade is from 30 to 500 rpm.

5. The method for granulating an ethylene/tetrafluoroethylene copolymer according to claim 1, wherein the concentration of the ethylene/tetrafluoroethylene copolymer contained in the slurry is from 50 to 200 g/L.

6. The method for granulating an ethylene/tetrafluoroethylene copolymer according to claim 1, wherein the total amount of ethylene and tetrafluoroethylene present in the slurry at the initiation of the granulation is from 0.02 to 0.2 $Nm^3$/L.

7. The method for granulating an ethylene/tetrafluoroethylene copolymer according to claim 1, wherein said stirring is accomplished with an anchor blade or a disk turbine blade.

8. The method for granulating an ethylene/tetrafluoroethylene copolymer according to claim 1, wherein granules of the ethylene/tetrafluoroethylene copolymer produced by said method comprise a content of fine particles of ethylene/tetrafluoroethylene copolymer having a particle size of less than 0.15 mm of at most 0.3 mass %.

9. The method for granulating an ethylene/tetrafluoroethylene copolymer according to claim 1, wherein the average particle size of the granules produced is from 0.5 to 5 mm.

10. The method for granulating an ethylene/tetrafluoroethylene copolymer according to claim 1, wherein the ethylene/tetrafluoroethylene copolymer comprises repeating units based on tetrafluoroethylene, repeating units based on ethylene, and repeating units based on a compound represented by the formula $CH_2{=}CX(CF_2)_nY$ wherein each of X and Y which are independent of each other, is a hydrogen atom or a fluorine atom, and n is an integer of from 2 to 8, the molar ratio of the repeating units based on tetrafluoroethylene/the repeating units based on ethylene is from 80/20 to 20/80, and the content of the repeating units based on a compound represented by the formula $CH_2{=}CX(CF_2)_nY$ is from 0.01 to 20 mol % in the total repeating units of the ethylene/tetrafluoroethylene copolymer.

11. The method for granulating an ethylene/tetrafluoroethylene copolymer according to claim 1, wherein granules of the ethylene/tetrafluoroethylene copolymer produced by said method comprise an amount of an ethylene/tetrafluoroethylene copolymer oligomer of at most 0.20%.

12. The method for granulating an ethylene/tetrafluoroethylene copolymer according to claim 1, wherein the average particle size of ethylene/tetrafluoroethylene copolymer granules obtained by said method is from 1 to 3 mm and wherein said granules comprise a content of fine particles of ethylene/tetrafluoroethylene copolymer having a particle size of less than 0.15 mm of at most 0.2 mass %.

* * * * *